Sept. 7, 1954   E. C. PIERCE   2,688,311
MEANS FOR AND METHOD OF DESTROYING GRUBS ON CATTLE
Filed Aug. 31, 1949

Eugene C. Pierce
INVENTOR,

BY

Bernard P. Miller
ATTORNEY

Patented Sept. 7, 1954

2,688,311

UNITED STATES PATENT OFFICE 2,688,311

MEANS FOR AND METHOD OF DESTROYING GRUBS ON CATTLE

Eugene C. Pierce, Oklahoma City, Okla.

Application August 31, 1949, Serial No. 113,337

1 Claim. (Cl. 119—156)

The invention relates to the control of the propagation of certain types of insects, and more particularly to certain types of flies which infest cattle, horses, and other domestic animals.

The present invention relates more specifically to flies such as those commonly called "heel flies," "warble flies," "cow flies," "horse flies" or the "black fly." Such flies are scientifically known as "Hypoderma lineata De Villers" or "Hypoderma bovis De Geer."

It has been estimated by the United States Bureau of Entomology and Plant Quarantine, that such flies cause a yearly loss of from fifty to one hundred millions of dollars.

The fly, in most cases, first attaches itself to the animal's back where it cannot be reached by the head or tail. It parts the hair and bores into the hide to feed upon the animal's blood, and after feeding, it deposits eggs in the hole through which it formerly fed. The egg develops into a larvae or "grub" and eventually emerges from its cystallic nest to fall to the ground, hibernating in the grass, leaves, or loose soil until it finally develops into a fly.

In some instance the eggs are attached by the fly to the base of a hair, and when the eggs hatch, the minute spiny maggots crawl down the hair and begin burrowing into the skin. Eventually the grub emerges, as above described, and falls to the ground for hibernation.

The above mentioned bureau recommends that the grubs, after becoming fairly well matured, be extracted from the hide by squeezing with the fingers. It also advises the injection of liquid insecticide into the grub containing cyst by use of an oil can. Such methods, to be effective, must be carried on meticulously over considerable periods of time and at proper intervals.

In Farmers' Bulletin No. 1596, published by the United States Department of Agriculture, in the last four lines of page 21, the bureau states that the application of proper powdered insecticide at fifteen or twenty day intervals is probably the most effective known method of control, since all grubs could thereby be destroyed before they reach maturity.

The bulletin also sets forth that the application of ill-smelling materials to the animal's back and legs "afford very little protection."

The present invention is based on the tenet that if the fly is kept from reaching the vulnerable area of the animal, it will be prevented from either boring into the skin and laying eggs in the bore hole, or from laying eggs on the hair of such area. Since the animal can protect itself from the flies over most of its body area, the back is probably the most vulnerable area, and the one most necessary to protect. Therefore, if the fly can be prevented from boring into or laying eggs on the animal's back, it will ultimately become extinct.

In carrying out the method of the present invention, the vulnerable area is "armored" by a protective covering, which prevents the fly from reaching either the hair or the skin of the animal. The covering is adhered to the animal's hair only, with care being taken to prevent any adherence to the hide itself.

The coating or "armor" may be applied in the form of a canvas or cloth sheet which is glued to the hair only, or it may be applied to the hair ends in liquid form. In the latter case, a glutinous commodity, capable of hardening when dry, is preferred. In either embodiment of the invention, the covering should be water proof.

By spacing the covering from the hide, such grubs as may be under the hide surface are permitted to emerge, but are prevented from falling to the ground where they can mature into flies. They simply die in the animal's hair. Further, air circulation is permitted between the covering sheet and the hide, thus preventing the development of a bald or hairless spot where the coating sheet is applied.

Other objects will be apparent from the following description when taken in conjunction with the accompanying single sheet of drawings, wherein.

Like characters of reference designate like parts in those figures of the drawings in which they occur.

In the drawings.

Figure 1:
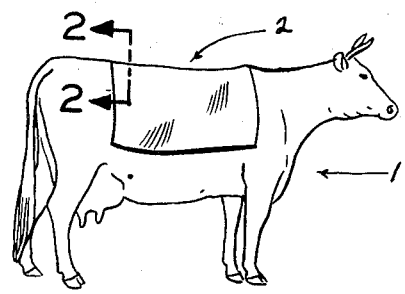
Figure 1 is a perspective view of an animal wearing the protective "armor" sheet of the present invention.

The reference numeral 1 indicates, as a whole, a bovine animal having its back and a portion of its sides covered by an "armored" sheet 2. The sheet 2 may be formed either out of fabric as illustrated in Fig. 2, or out of a suitable glutinous substance, as shown in Fig. 3.

Figure 2:
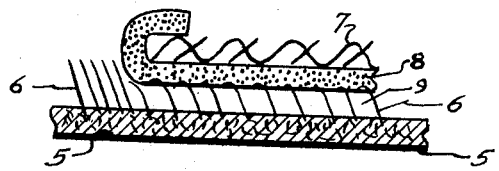
Figure 2 is an enlarged diagrammatic sectional view taken through the animal's hide and showing a cloth sheet applied to the hair in accordance with the present invention; and, Figure 3 is a similar view showing an "armor" sheet formed of a suitable glutinous substance.

In the embodiment of Fig. 2, the reference numeral 5 indicates the animal's hide having hair 6 growing outwardly therefrom. A cloth or canvas sheet 7 is adhered to the hair 6 by a suitable glue or cement 8, with a space 9 being left between the glue and the hide. It is preferred that a coating of the glue 8 be extended around the edge of the sheet 7, so that its edge portions will be slightly stiffened thereby.

Figure 3:
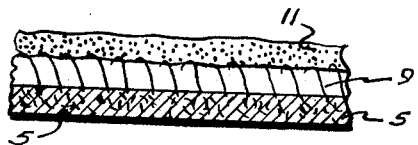

In the embodiment of Fig. 3, a sheet 11 is formed by applying glue or other suitable substance, capable of hardening, to the outer end portions of the animal's hair. In applying the substance, care is taken to maintain the air space 9 between the sheet and the hide.

In the embodiment of Fig. 2, it is anticipated that the canvas sheet 7 not only be waterproofed, but that it be impregnated with some suitable insecticide such as rotenone ($C_{23}H_{22}O_6$), or a commercial solution of "D.D.T." In the embodiment of Fig. 3, the insecticide may be mixed in the substance while in liquid form.

Obviously the invention is susceptible to some change or alteration without defeating its practicability, and I therefore do not wish to be confined to the preferred embodiment shown in the drawings and described herein, further than I am limited by the scope of the appended claim.

I claim:

The method of desetroying heel-fly grubs which have been nurtured in cysts beneath the hide of living cattle, which consists of: providing an enclosed area between the skin of the animal and the outer end portions of the hair thereon, thereby imprisoning the grubs in the said enclosed area as said grubs emerge from said cysts; and leaving the grubs so imprisoned without sustenance for a time period greater than the life span of said grubs.

References Cited in the file of this patent

UNITED STATES PATENTS

| Number | Name | Date |
|---|---|---|
| 414,752 | Chapman | Nov. 12, 1889 |
| 716,574 | Nimmo | Dec. 23, 1902 |
| 790,620 | Crofford | May 23, 1905 |
| 885,694 | Goff | Apr. 21, 1908 |
| 1,084,091 | Knoepfler | Jan. 13, 1914 |
| 1,398,381 | Laacke | Nov. 29, 1921 |
| 1,425,301 | Warnerford | Aug. 8, 1922 |
| 1,553,632 | Rieck | Sept. 15, 1925 |
| 1,560,683 | Foley | Nov. 10, 1925 |
| 1,620,539 | Gernsback | Mar. 8, 1927 |
| 2,017,159 | Mucha | Oct. 15, 1935 |
| 2,033,357 | Riker | Mar. 10, 1936 |
| 2,176,162 | Walter | Oct. 17, 1939 |
| 2,219,569 | Vanderhoof | Oct. 29, 1940 |
| 2,315,772 | Closs | Apr. 6, 1943 |
| 2,377,774 | Gotham | June 5, 1945 |